(12) United States Patent
Farey

(10) Patent No.: US 9,792,941 B2
(45) Date of Patent: Oct. 17, 2017

(54) METHOD AND SYSTEM FOR DATA REPLICATION

(75) Inventor: Christopher John Farey, Bristol (GB)

(73) Assignee: StorMagic Limited, Bristol (GB)

( * ) Notice: Subject to any disclaimer, the term of this patent is extended or adjusted under 35 U.S.C. 154(b) by 0 days.

(21) Appl. No.: 13/069,473

(22) Filed: Mar. 23, 2011

(65) Prior Publication Data

US 2012/0243395 A1   Sep. 27, 2012

(51) Int. Cl.
*G11B 5/86* (2006.01)
*G06F 11/20* (2006.01)

(52) U.S. Cl.
CPC ........... *G11B 5/86* (2013.01); *G06F 11/2094* (2013.01); *G06F 2201/84* (2013.01)

(58) Field of Classification Search
CPC .............. G06F 11/1458; G06F 3/0607; G06F 11/2094; G06F 2201/84; G06F 11/1435; G06F 2211/104; G06F 12/00; G06F 17/30091; G06F 17/30215; G06F 17/30575; G06F 2212/466
See application file for complete search history.

(56) References Cited

U.S. PATENT DOCUMENTS

| | | | |
|---|---|---|---|
| 6,859,863 B1 * | 2/2005 | Miller ................. | G06F 12/0817 711/118 |
| 6,959,369 B1 * | 10/2005 | Ashton et al. ................. | 711/162 |
| 7,603,530 B1 * | 10/2009 | Liikanen et al. ............. | 711/162 |
| 7,613,752 B2 * | 11/2009 | Prahlad et al. | |
| 7,657,578 B1 * | 2/2010 | Karr ..................... | G06F 11/2069 707/610 |
| 7,685,360 B1 * | 3/2010 | Brunnett ............... | G06F 3/0608 360/31 |
| 8,271,751 B2 * | 9/2012 | Hinrichs, Jr. ................. | 711/161 |
| 8,935,208 B2 * | 1/2015 | Brown ................ | G06F 11/1458 707/610 |
| 9,020,987 B1 * | 4/2015 | Nanda ....................... | G06F 3/06 707/821 |
| 2003/0061456 A1 * | 3/2003 | Ofek .................... | G06F 11/1458 711/162 |
| 2005/0081099 A1 * | 4/2005 | Chang ................. | G06F 11/1466 714/15 |
| 2007/0103984 A1 * | 5/2007 | Kavuri et al. ........... | 365/185.17 |

* cited by examiner

*Primary Examiner* — Jennifer Mehmood
*Assistant Examiner* — Parul Gupta
(74) *Attorney, Agent, or Firm* — Gordon & Jacobson, P.C.

(57) ABSTRACT

A method and system of replicating data stored on a storage device where an update is stored in a snapshot. The update includes a copy of at least one portion of the data stored on the storage device. Metadata relating to the update is also stored. The replica is periodically updated by copying the contents of the snapshot into the replica in accordance with the stored metadata. After the replica is updated, the snapshot can be deleted.

14 Claims, 1 Drawing Sheet

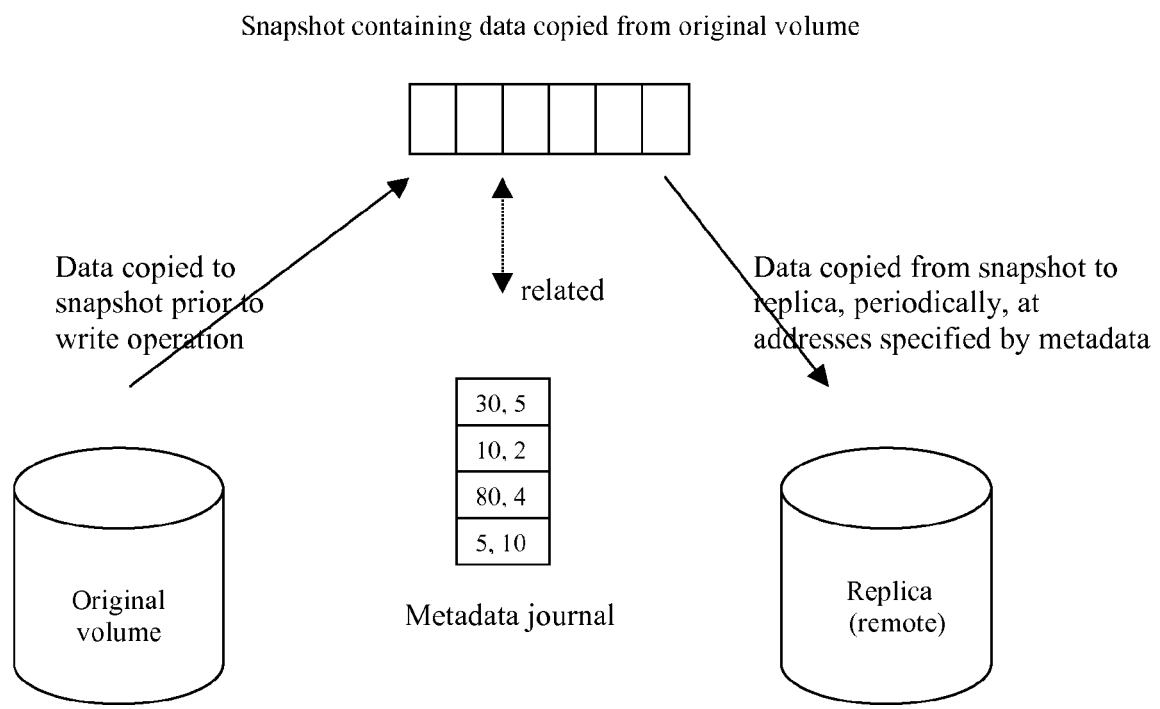

METHOD AND SYSTEM FOR DATA REPLICATION

BACKGROUND OF THE INVENTION

1. Field of the Invention

The present invention relates to relates generally to the field of data replication within distributed computer systems.

2. Related Art

It is well known that storage devices (e.g. disk drives) may fail over time or may be lost due to theft or natural disasters such as fire. However, whilst hardware can usually be replaced with relative ease, the loss of data can be catastrophic as another copy cannot simply be purchased off the shelf. Therefore, individual users and organizations typically create backup copies of data so that in the event of a hardware loss, such as disk failure, normal operations can be resumed with minimal disruption.

Typically, a large organization will back up the contents of its disk drives onto (relatively slow) tape storage devices. However, a considerable length of time, perhaps several hours, may be required to take a full backup of a large data set and so backups often have to be made during 'down times' such as overnight or out of business hours. Furthermore, inconsistencies can arise if changes are made to the data while the backup is in progress and so write operations may need to be blocked while the backup is being created. However, this unavailability is not acceptable to organizations which require uninterrupted access to their data.

Therefore, it is advantageous to create an instantaneous copy of a disk's contents while applications are running. Virtualization techniques can be used within networks to create and maintain (in real-time) a replica of the data set on other storage devices, the replica being updated over time as the data changes in response to write operations. In this way, reliable access to the data may be preserved via the remotely stored replica if the local storage device becomes inoperable, whilst maintaining high availability of data and functionality. Thus, whilst a backup copy may remain unchanged for a relatively long period of time, a replica will be updated frequently as a result of applications which are running and writing updates to the data set. Several known replication techniques have been developed to copy data to other storage devices.

Mirroring

Mirroring is a known data replication technique where the contents of a logical disk volume are copied onto other storage devices. Each time a write operation occurs, the data is copied from the host server to the other storage devices. These other storage devices may be situated locally or remotely, or may sometimes be provided as a combination of both. As multiple copies of the data exist, the data can be retrieved from at least one of those copies should a hardware failure occur. Typically, the data is mirrored onto physical devices (hard drives) although logical drives may also be used. Moreover, replication may be implemented as microcode on a disk array controller or as software running on a server. FIG. 1 shows a simple illustration of a prior art mirroring arrangement.

When this process is performed over a relatively short geographical distance, the term 'mirroring' may often be used. However, the term 'storage replication' is typically used when larger geographical distances are involved. Various replication techniques are known.

Synchronous Storage Replication

Synchronous storage replication is a known data replication technique where identical copies of the data are stored on separate storage devices in communication with the host server. When performing a write operation, the server needs to know when the data has been copied to each and every storage device. Thus, each storage device sends a receipt when it has received and stored the data. The write is only considered complete when it has been performed on, and acknowledged by, all the storage devices. If one of the storage devices fails to acknowledge completion of the write operation, then the overall write operation is deemed not to have been completed.

The advantage of this approach is that high availability is possible. If one copy of the data becomes unavailable to the host server, the host server can instantly fail over and use another copy of the data, in the knowledge that the copy it is accessing contains data exactly as expected; no consistency checking of the data is necessary.

However, as applications running on the server may wait for a write operation to complete before proceeding with other operations, the overall performance of the system can decrease considerably if it takes some time for the acknowledgement to be received by the server. This latency problem increases over large geographical distances, and so synchronous replication is only really practical over smaller distances.

Asynchronous Storage Replication

Asynchronous storage replication is a known data replication technique where separate storage devices are used to store copies of the data. Although all storage devices are updated when a write operation is requested by an application, the write operation is considered complete as soon as (only) one designated storage device acknowledges it. Whilst long-distance performance is greatly increased in comparison to the synchronous approach, if the designated storage device fails then the other storage device(s) are not guaranteed to store the current copy of data. Thus, whilst synchronous mirroring usually achieves a Recovery Point Objective (RPO) of zero lost data, with asynchronous writing the most recent updates to the data may be lost and the application data stored may not be self consistent. Thus, there is a problem of 'crash-consistency' which typically necessitates data consistency checking and repair before the copy is usable.

Point-in-Time Replication

Point-in-time replication is a known data replication technique where snapshots of the data are taken periodically. A read-only copy of the data is taken at a particular point in time. Once the initial copy has been created, subsequent snapshots need only copy the updates (i.e. changes) which are made to the data set held on the storage device, allowing applications to continue writing data to the local storage device whilst the snapshots are being taken. This has the advantage that the snapshots can be taken at such times when applications have been quiesced, memory caches have been flushed and the copied data is guaranteed to be self-consistent.

When an application wants to perform a write operation on a block (or several blocks) of data on the local disk, a snapshot is taken of the relevant portion of data before the change is made. The pre-write data is copied into the snapshot and then the write operation is performed, updating the original data volume. This is known as the 'copy-on-write' approach to snapshots. The replica on the remote storage device can then be updated using the copied blocks of data which have been stored in the snapshot. The update of the replica data set can be performed periodically (for example, every half an hour).

By copying the soon-to-be-changed blocks of data to a snapshot on another storage device, an historical record of the data can be maintained. Should the local disk then fail, preventing access to the original data volume, the data can be retrieved from the updated replica on the remote device.

A snapshot is typically implemented using an empty data store and a system of pointers to reference the replica. Advantageously, as only the changed data is copied during replication, rather than the entire contents of the storage device, the replica can be maintained over smaller, less expensive lower bandwidth links than would be required for a synchronous mirror.

However, the snapshot of changes grows over time as more write operations are performed on the data. It is also known that in practice, organizations have a tendency to keep the snapshot data for an extended period of time, thus using up resources. These factors can cause the performance of replicated storage to degrade.

SUMMARY OF THE INVENTION

The problems of the prior art are solved by the present invention, which provides an efficient mechanism to maintaining a remote replica of a storage device, the replica being updated periodically from a snapshot.

In accordance with a first aspect of the present invention there is provided a method for maintaining a replica of a storage device, the method comprising the steps:
  i) storing an update in a snapshot, the update comprising a copy of at least one portion of the data stored on the storage device;
  ii) storing metadata relating to the update; and
  iii) periodically updating the replica by copying the contents of the snapshot into the replica in accordance with the stored metadata.

Optionally, the snapshot may be deleted. The snapshot may be deleted after step iii).

Preferably, the replica is a copy of the storage device. The replica may be stored on a separate (i.e. physically distinct) storage device to the original storage device. (By 'original' storage device it is meant the storage device that is being replicated).

The storage device upon which the replica is stored may be remotely located from the original storage device upon which the original data is stored. This provides the advantage that if the local storage device (upon which the data set is stored) is lost, the data may be retrieved using the replica.

Preferably, the metadata is stored in a journal (or 'list' or 'log') on a separate storage device, to avoid the use of the journal affecting the performance of the replicated storage device.

Preferably, the storage device and the replica are stored on physical disk devices. The storage device and the replica may be stored on random access block-structured storage devices.

Preferably, the metadata comprises a Logical Block Address. The Logical Block Address may specify the first address in the replica where an update is to be copied to.

Preferably, the metadata comprises a Block Count. The Block Count may specify how many data blocks the update is to occupy in the replica.

Preferably, the metadata is sorted prior to updating the replica. Preferably, the metadata is sorted by the Logical Block Address. The process of updating the replica may be made more efficient as a result of pre-sorting the metadata. The efficiency may be improved because less mechanical movement may be required of the storage device during the update process, thus taking less time to complete.

Preferably, the metadata is merged prior to updating the replica. Preferably, the merging process is performed in relation to the Logical Block Address. The process of updating the replica may be made more efficient as a result of merging the metadata. The efficiency may be improved because less mechanical movement may be required of the storage device during the update process, thus taking less time to complete.

Preferably, the snapshot contents (i.e. the blocks copied from the original volume) may be deleted after the replica has been updated. Additionally or alternatively, the stored metadata relating to the updates in the snapshot may be deleted after the replica has been updated.

In accordance with a second aspect of the present invention there is provided a computer-implemented system for maintaining a replica of the contents of a storage device, the system comprising:
  a plurality of storage means for storing:
    a data volume which is the contents of the storage device;
    a snapshot comprising at least one update, the update comprising a copy of at least one block of data in the data volume;
    metadata relating to the at least one update stored in the snapshot;
    a replica of the data volume; and
  software configured to periodically update the replica by copying the contents of the snapshot into the replica in accordance with the stored metadata.

The computer-implemented system may be configured to implement the method of claim 1.

The data volume may be the contents of a single logical or physical storage device. The computer-implemented system may comprise software configured to sort and/or merge the metadata prior to updating the replica so as to enhance or preserve the efficiency of the updating of the replica.

These and other aspects of the present invention will be apparent from and elucidated with reference to the embodiment described herein.

An embodiment of the present invention will now be described, by way of example only, and with reference to the accompanying drawings.

BRIEF DESCRIPTION OF THE DRAWINGS

FIG. 1 shows a conceptual view of the present invention.

DETAILED DESCRIPTION OF THE PREFERRED EMBODIMENTS

Turning to FIG. 1, a data volume is stored on a local storage device and a replica of that data volume is stored on a physically remote device. The local and remote storage devices are random-access block storage devices. A block device, such as a hard drive, is one which reads and writes data in blocks of a predetermined size. Each block is identified by a unique address ranging sequentially from 0 to N−1, where N is the number of blocks on the disk. A read/write head is positioned on the end of an arm provided just above the surface of the disk, the arm being able to move in and out over the surface of the disk as it rotates underneath the head.

Typically, a hard drive will consist of a stack of hard disks with arms (and their respective read/write heads) provided between each disk. If a block of data is to be accessed (read from or written to the disk), the head must be positioned over the relevant block. If the block is some distance away on the disk from the current location of the head, a delay will ensue because the head will need to travel towards or away from the centre of the disk to the correct location (seek time) and the disk will need to rotate to bring the required portion of the surface area directly under the head (rotational delay).

When an application running on the server wishes to write to a block or group of blocks within the data volume (i.e. the data set is about to be changed) a copy of the current contents of those blocks is copied to a data store (the snapshot). The snapshot is stored on another (remote) storage device relative to the data volume. This is in accordance with the copy-on-write approach.

Crucially, however, a journal (or 'list' or 'log') is also provided. When the data is copied from the data volume into the snapshot, metadata relating to that copy is inserted into the metadata journal.

The metadata comprises two numeric values as follows:
1. The Logical Block Address: this specifies the first block address within the replica where the copy is to be copied to from the snapshot when the replica next gets updated;
2. Block Count: this specifies how many blocks of data are to be changed within the replica as a result of copying this particular update into the replica.

For example, suppose that an application wishes to write to block addresses 6, 7, 8 and 9 within the data volume. Thus, the contents of these blocks is about to be overwritten and so a copy is made of these contents and placed into the snapshot. The numbers 6 and 4 are inserted into the metadata journal to indicate that, when the replica is eventually updated at the end of the present time period, those contents are to be copied into the replica starting at block address 6 and will update 4 blocks (i.e. blocks 6, 7, 8 and 9). Once the snapshot and the journal have been updated, the write operation can be performed on the data volume, thus changing the data at those blocks.

Another way of expressing this is to say that, for example, the metadata 6, 4 indicates that a particular update in the snapshot will cause 4 blocks of data to be written to in the replica, starting at block 6.

As more and more write operations are performed over time, the snapshot grows. The metadata journal also grows because each update inserted into the snapshot has metadata associated with it.

After a period of time, the replica will be refreshed or updated to reflect the changes which have occurred to the data set since the replica was last updated. The contents of the snapshot are then inserted into the replica at the block addresses specified by the metadata in the journal.

Thus, the general approach of the invention might be expressed as:
i) storing metadata describing all the changes which occur to a storage device between periodic updates; and
ii) at the time a periodic update occurs taking an consistent snapshot of the storage device; and
iii) using the stored metadata to copy the changes to the storage device from the snapshot to the replica, after which the snapshot may be deleted.

In order to improve efficiency, the metadata can be processed prior to updating the replica. This may involve ordering and/or merging the metadata.

For example, suppose that the metadata journal contains the following pairs of values for three updates stored in the snapshot as follows:

10, 10
4, 6
20, 2.

This can be expressed as meaning that, when the replica is updated, blocks 10 to 19, 4 to 9, and 20 to 21 will be changed. By merging these ranges, it becomes apparent that blocks 4 to 21 will be updated in the replica. This improves efficiency because adjacent blocks can be written to in order, requiring less movement of the arm and read/write heads (i.e. seek time) and less time waiting for the disk to rotate such that the desired portion of the disk surface is under the head (rotational delay). Seek time and rotational delay can greatly degrade performance and so merging the metadata items prior to writing to the replica provides a means of reducing the amount of mechanical movement required by the storage device, thus improving efficiency and speed in respect of the time required to perform the replica update.

Similarly, the metadata items could be ordered. Suppose that the metadata journal contains the following pairs of values for three updates stored in the snapshot as follows:

10, 10
50, 4
30, 3.

Without sorting the metadata, the first update is copied from the snapshot to the replica starting at address 10. The second update is copied into the replica starting at block 50. Thus, the arm has to move past block 30 to jump to block 50. Then, it must move back again to block 30 in order to write the third update into the replica. If, however, the metadata items are sorted (such that the updates are written starting at addresses 10, 30 and 50 in sequence) less mechanical movement is required of the device, thus improving efficiency.

Thus, the present invention provides the following advantages:
The metadata journal is populated with pairs of numbers; thus the size of the journal is relatively small and the overhead is slight;
The journal may be maintained on a separate physical storage device, and so performance of the original storage device is only degraded for a short time;
The snapshot does not need to be preserved for a long period of time, and so it does not grow to a size which consumes additional storage resources;
The snapshot can be read efficiently as metadata in the journal can be sorted or merged.
The replica can be written efficiently as the changed data is written in order.

There have been described and illustrated herein several embodiments of a method and system for data replication. While particular embodiments of the invention have been described, it is not intended that the invention be limited thereto, as it is intended that the invention be as broad in scope as the art will allow and that the specification be read likewise. Thus, in the claims below, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage. It will therefore be appreciated by those skilled in the art that yet other modifications could be made to the provided invention without deviating from its spirit and scope as claimed.

The invention claimed is:

1. A method for replicating a physical block storage device, the method comprising the steps:
   i) providing a data volume stored on a physical block storage device configured to read and write data in blocks of a predetermined size;
   ii) providing a replica of said data volume stored on a second storage device;
   iii) providing a snapshot stored separately from the replica and data volume, wherein the snapshot contains at least one update that comprises at least one block of data copied from the data volume;
   iv) providing a journal for storing metadata associated with each update contained in the snapshot, the journal being separate from the snapshot, the data volume and the replica;
   v) prior to changing the contents of at least one particular block of data of the data volume, taking a copy of said at least one particular block of data of the data volume and storing said copy as an update in said snapshot, and storing in said journal metadata associated with the update stored in v), wherein the metadata includes
      a Logical Block Address specifying the first address in the replica where the update stored in v) is to be copied to, and
      a Block Count specifying how many data blocks the update stored in v) is to occupy in the replica;
   vi) changing the contents of said at least one block of data stored on the physical block storage device; and
   vii) periodically updating the replica after expiry of a predefined period of time by copying the contents of the snapshot into the replica in accordance with metadata stored in the journal such that the update stored in v) is copied from the snapshot into the replica starting at said Logical Block Address and occupying the number of data blocks specified in said Block Count.

2. A method according to claim 1, wherein:
the replica is a copy of the contents of the physical block storage device.

3. A method according to claim 1, wherein:
the second storage device that stores the replica is separate from the physical block storage device that stores the data volume.

4. A method according to claim 3, wherein:
the second storage device is remotely located from the physical block storage device.

5. A method according to claim 1, wherein:
the journal is stored on a storage device separate from the physical block storage device.

6. A method according to claim 1, wherein:
the physical block storage device and the second storage device are random access block-structured storage devices.

7. A method according to claim 1, wherein:
the metadata is sorted prior to updating the replica to enhance or preserve the efficiency of the updating of the replica.

8. A method according to claim 1, wherein:
the metadata is merged prior to updating the replica to enhance or preserve the efficiency of the updating of the replica.

9. A method according to claim 1, wherein:
the snapshot and/or the stored metadata is deleted after the replica has been updated.

10. A system for replicating the contents of a physical block storage device, the system comprising:
   a plurality of storage means for storing:
   i) a data volume which is the contents of the physical block storage device, wherein the contents of the physical block storage device comprise data in blocks of a predetermined size;
   ii) a replica of said data volume stored on a second storage device;
   iii) a snapshot stored separately from the replica and data volume, wherein the snapshot contains at least one update that comprises at least one block of data copied from the data volume;
   iv) a journal for storing metadata associated with each update contained in the snapshot, the journal being separate from the snapshot, the data volume and the replica;
   v) software configured to perform first operations prior to changing the contents of at least one particular block of data of the data volume, wherein the first operations include taking a copy of said at least one particular block of data of the data volume and storing said copy as an update in said snapshot, and storing in said journal metadata associated with the update stored by the first operations, wherein the metadata includes
      a Logical Block Address specifying the first address in the replica where the update stored by the first operations of v) is to be copied to, and
      a Block Count specifying how many data blocks the update stored by the first operations of v) is to occupy in the replica; and
   vi) software configured to periodically update the replica after expiry of a predefined period of time by copying the contents of the snapshot into the replica in accordance with metadata stored in the journal such that the update stored by the first operations of v) is copied from the snapshot into the replica in accordance with its associated metadata starting at said Logical Block Address and occupying the number of data blocks specified in said Block Count.

11. A system according to claim 10, further comprising:
software configured to sort and/or merge the metadata prior to updating the replica so as to enhance or preserve the efficiency of the updating of the replica.

12. A method according to claim 1, further comprising:
subsequent to v), deleting the snapshot.

13. A method according to claim 1, wherein:
the at least one block of data is copied to define the snapshot prior to writing the update on the physical block storage device.

14. A system according to claim 10, wherein:
the at least one block of data is copied to define the snapshot prior to writing the update on the physical block storage device.

* * * * *